United States Patent
Stewart

[15] 3,655,238
[45] Apr. 11, 1972

[54] RETRACTABLE CLOSURE
[72] Inventor: Ted Stewart, Royal Oak, Mich.
[73] Assignee: General Electric Corporation, Detroit, Mich.
[22] Filed: Dec. 2, 1970
[21] Appl. No.: 94,493

[52] U.S. Cl. ..........................................296/107
[51] Int. Cl. ............................................B60j 7/10
[58] Field of Search ..........................296/107, 108, 111, 137 R

[56] References Cited

UNITED STATES PATENTS

| | | | |
|---|---|---|---|
| 3,195,549 | 7/1965 | Stevens | 296/107 |
| 3,347,592 | 10/1967 | Renneker | 296/107 |
| 3,476,437 | 11/1969 | Schroeder | 296/107 |

Primary Examiner—Benjamin Hersh
Assistant Examiner—Robert R. Song
Attorney—W. E. Finken and D. L. Ellis

[57] ABSTRACT

A retractable closure for a vehicle body having a roof structure extending over only a portion of the passenger compartment, the retractable closure including a frame bodily movable between extended and retracted positions corresponding to open and closed conditions of the vehicle body, a flexible cover attached at one edge thereof to the leading edge of the roof structure, and at the other edge thereof to the header of the frame and intermediate the edges to a transverse bow supported on the frame for generally vertical movement relative to the latter, and a cam guide on the vehicle body and cooperating roller follower attached to the bow. As the frame moves from the extended to the retracted position the transverse bow causes folding of the cover generally in half below the roof structure while the cam guide and follower cooperate to lift the folded cover into juxtaposition with and under the roof structure to maximize passenger head room.

3 Claims, 6 Drawing Figures

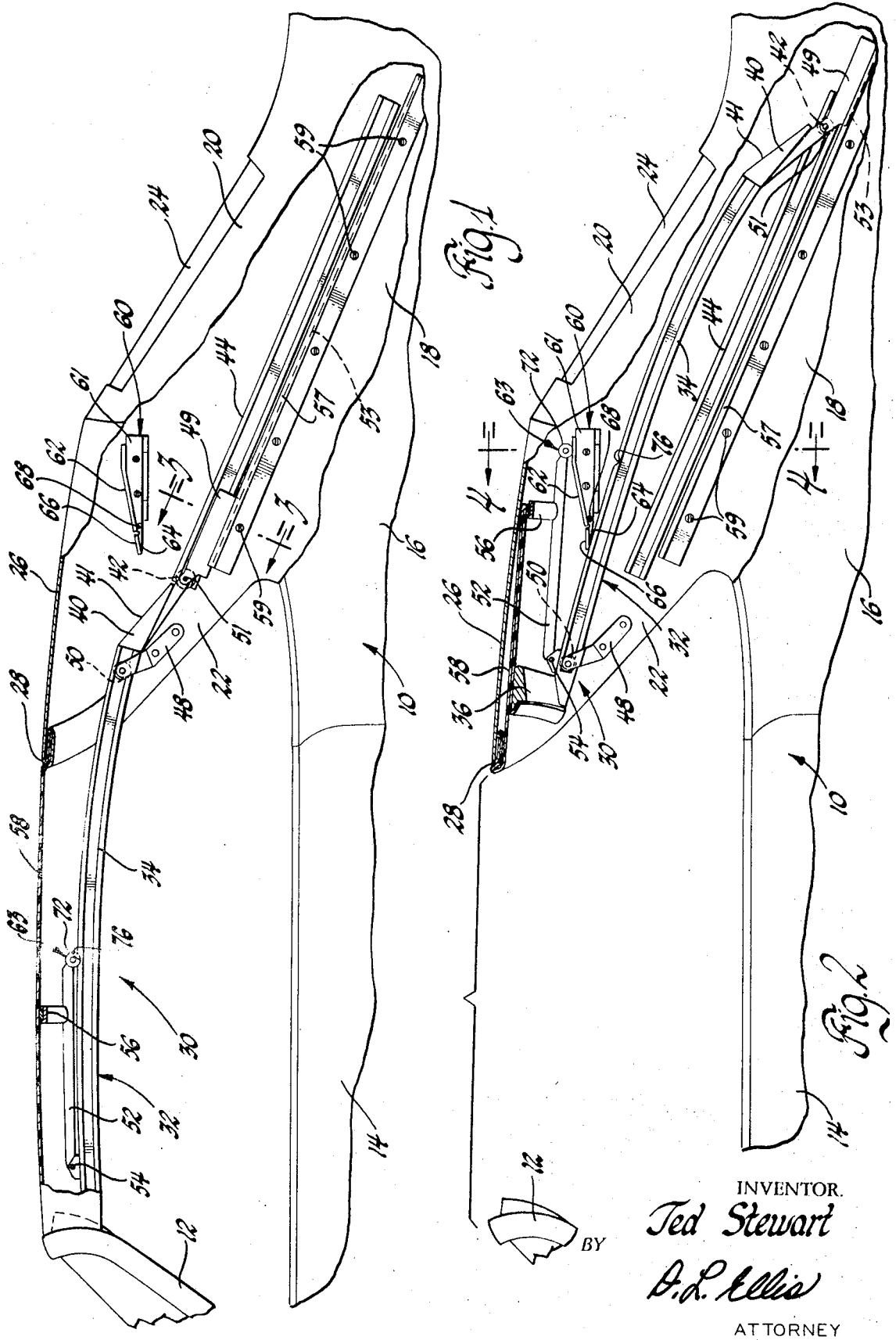

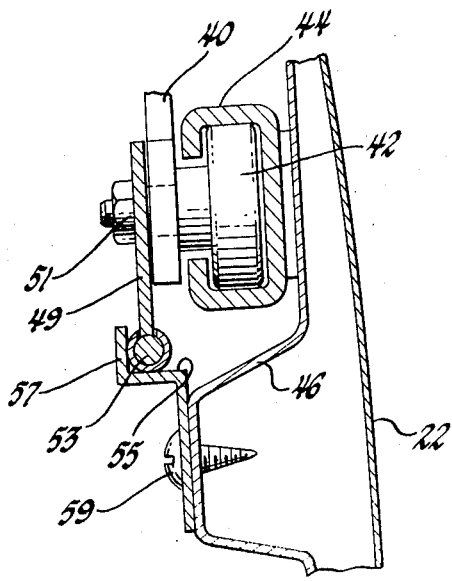
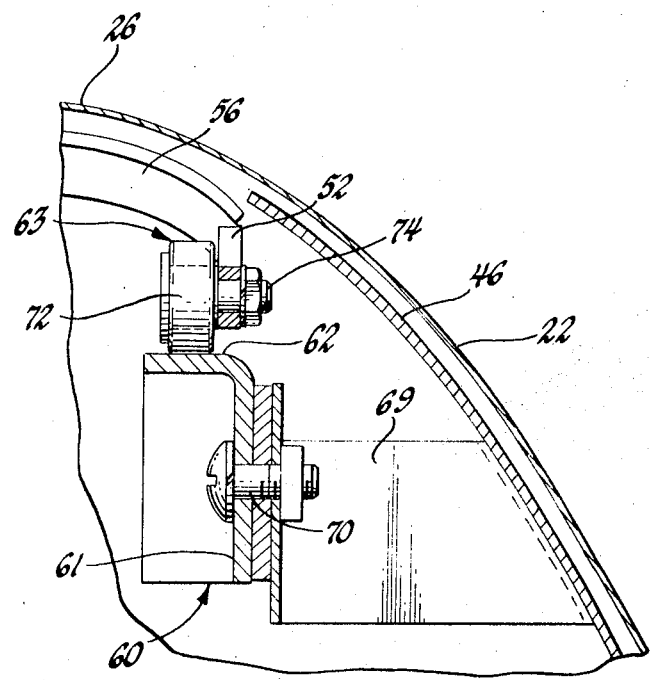
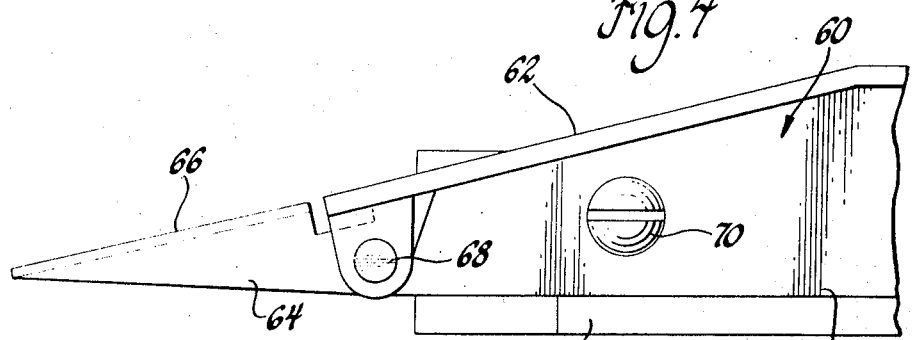
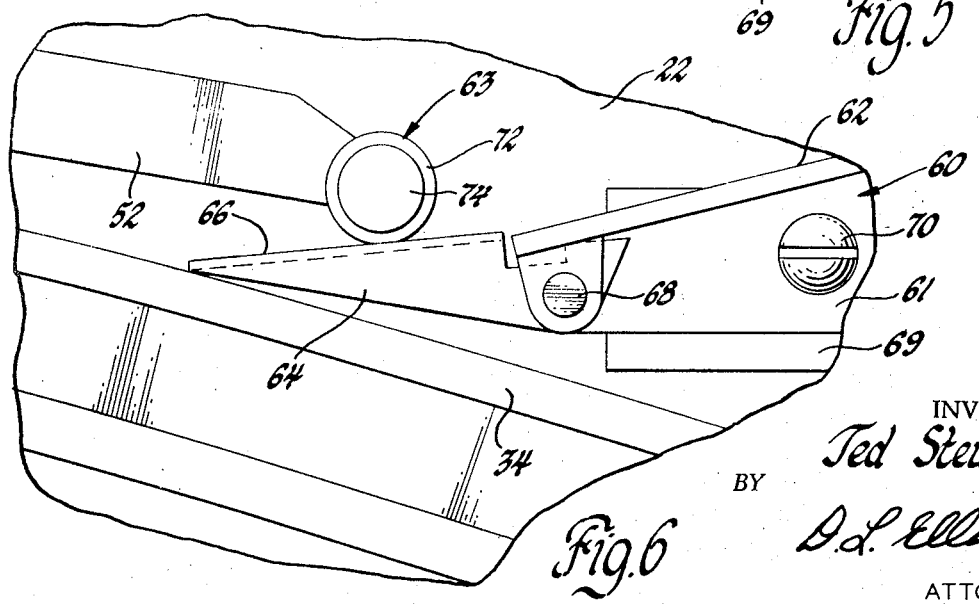
INVENTOR.
Ted Stewart
BY
D. L. Ellis
ATTORNEY

RETRACTABLE CLOSURE

This invention relates generally to vehicle bodies and in particular to retractable closure means for a vehicle body having a roof structure extending over only a portion of the passenger compartment.

The half-convertible type automobile vehicle body, wherein a rigid roof structure extends over only a portion of the passenger compartment and a retractable closure selectively covers the remainder, represents an attempt to combine into one vehicle body the most desirable characteristics of the coupe style vehicle body and the sporty convertible style vehicle body. Accordingly, numerous retractable closure arrangements have been proposed and incorporate either rigid panels movable between open and closed positions or flexible or cloth covers mounted on movable frames. The latter type arrangements, while normally being less expensive than those incorporating rigid panels, have not always functioned satisfactorily because of the inherent problems associated with handling and efficiently stowing flexible covers. A retractable closure means according to this invention provides a relatively simple arrangement whereby a flexible cover can be opened and closed easily and stowed in a manner requiring a minimum of space above the passenger compartment.

The primary feature of this invention is that it provides a new and improved retractable closure means for a vehicle body having a passenger compartment, a windshield support forward of the passenger compartment, and a rigid roof structure extending over only a portion of the passenger compartment. Another feature of this invention is that it provides a retractable closure means including a frame member bodily movable relative to the vehicle body between extended and retracted positions corresponding respectively to the open and closed conditions of the vehicle body, the frame member supporting a flexible cover and incorporating means operative during opening movement of the frame member to fold the cover generally in half for storage under the roof structure. Yet another feature of this invention resides in the provision in the retractable closure means of cam means on the vehicle body and on the frame member, the cam means being operative during movement of the frame member to the retracted position to lift the folded cover up into a stowed position in juxtaposition with and under the roof structure. A still further feature of this invention resides in the provision in the retractable closure means of a frame member having a single transverse bow which bow has the flexible cover attached thereto and moves during opening movement of the frame member from a position in front of to a position behind a leading edge of the roof structure to achieve folding of the cover in half, the bow being supported on the frame member for generally vertical movement relative thereto to accommodate lifting of the folded cover into the stowed position.

These and other features of this invention will be readily apparent from the following specification and from the drawings wherein:

FIG. 1 is a fragmentary partially broken away side elevational view of a half-convertible type automobile vehicle body including a retractable closure means according to this invention shown in closed position;

FIG. 2 is similar to FIG. 1 but showing the retractable closure means in open position;

FIG. 3 is an enlarged sectional view taken generally along the plane indicated by lines 3—3 in FIG. 1;

FIG. 4 is an enlarged sectional view taken generally along the plane indicated by lines 4—4 in FIG. 2;

FIG. 5 is an enlarged view of a portion of FIG. 1 showing the guide portion of the cam means; and FIG. 6 is a view similar to FIG. 5 but showing the follower portion of the cam means engaging the guide portion.

Referring now to FIGS. 1 and 2 of the drawings, there is shown a half-convertible type automobile vehicle body designated generally 10 including a windshield support 12, a pair of closure doors each vertically hinged at its forward edge on the vehicle body for swinging movement, only left door 14 being shown, a left quarter panel structure 16 and a right quarter panel structure 18. A left sail panel structure 20 above and integral with left quarter panel structure 16 cooperates with a similar right sail panel structure 22 above and integral with right quarter panel structure 18 in sealingly supporting a conventional backlite 24 and in supporting a rigid roof structure 26 having a leading edge 28, the roof structure 26 extending forwardly on the vehicle body to cover only a portion of the passenger compartment located therebelow between the closure doors and the quarter panel structures rearward of the windshield support.

A retractable closure means designated generally 30 is provided on the vehicle body for selectively opening and closing the space between the leading edge 28 of the roof structure 26 and the windshield support 12, the retractable closure means being symmetrical with respect to the longitudinal centerline of the vehicle body so that only the right side half of the closure means is shown in the drawings and described hereinafter. As seen best in FIGS. 1 and 2, the retractable closure means 30 includes a generally U-shaped frame member 32, the latter including a longitudinally extending right side rail 34 in the form of inwardly opening cam channel and a header 36 rigidly connecting the forward end of the right side rail 34 to the corresponding left side rail, not shown. A support plate 40 having an upper edge 41 is rigidly affixed to the rear end of the right side rail 34 and supports for rotation about a fixed axis of the plate a roller 42, FIG. 3.

The roller 42 is guidingly received in a cam channel 44 rigidly affixed by conventional means to an inner panel portion 46 of the right sail panel structure 22, FIG. 3. As seen best in FIGS. 1 and 2, a bracket member 48 is rigidly affixed to the right sail panel structure 22 and supports for rotation about a fixed axis of the bracket member a roller 50. The roller 50 is received within right side rail 34 of the frame member 32.

As seen best in FIGS. 1 and 2, the frame member 32 is thus supported in cantilever fashion on the sail panel structures of the vehicle body with the roller 50 functioning as a fulcrum and the fixed cam channel 44, through the roller 42 and support plate 40 controlling the attitude of the frame member. The rollers 42 and 50 also function to permit relatively frictionless fore and aft bodily movement of the frame member 32 between an extended position, FIG. 1, wherein header 36 is sealingly engaged on windshield support 12 with the side rails spanning the distance between the latter and the sail panel structures and a retracted position, FIG. 2, situated completely under the roof structure with each side rail housed generally within a corresponding one of the sail panel structures.

Referring now to FIGS. 1, 2 and 3, a conventional drive arrangement is provided to move the frame member 32 between the extended and retracted positions and includes a connector plate 49 attached to support plate 40 at 51 for pivotal movement relative thereto about the axis of roller 42. As seen best in FIG. 3, the connector plate has secured thereto along one edge the forward end of a conventional flexible push-pull type drive member 53, the drive member being slidable on a flange surface 55 of a member 57 attached to the inner panel portion 46 of the right sail panel structure by screws 59. The other end of the drive member cooperates with a gear box and electric motor unit, not shown, which is selectively operable by the vehicle operator, the gear box and motor unit being operative to initiate sliding movement of the drive member and corresponding fore and aft bodily movement of the frame member 32.

The frame member 32 further includes a radius arm 52 supported on right side rail 34 at 54 for pivotal movement relative thereto and for bodily movement as a unit with the frame member. A bow 56 extending transversely across the frame member is rigidly attached to the radius arm 52 and to a similar radius arm, not shown, on the left side rail. The transverse bow 56 is sufficiently distant from the pivot 54 to experience essentially vertical movement relative to the frame member in response to pivotal movement of the radius arm.

As seen best in FIGS. 1 and 2, a flexible or cloth type cover 58 has a front transverse edge secured to the frame member 32 across the header 36 and a rear transverse edge secured to the roof structure 26 adjacent the leading edge 28 of the latter, the cover 58 thus providing continuity of closure over the passenger compartment in the extended position of the frame member. Intermediate its front and rear edges the cover 58 is secured to the transverse bow 56 across the entire length of the latter. Conventional pads or the like, not shown, are provided along the longitudinal side edges of the cover to effect satisfactory weather sealing with the side rails when the frame member is in the extended position.

When the drive member 53 initiates rearward bodily movement of the frame member from the extended position, the downward slope of the cam channel 44 tilts the frame member 32 clockwise, FIGS. 1 and 2, about roller 50 so that the bow 56 and header 36 are drawn under leading edge 28 of the roof structure. Initial rearward movement of the frame member causes the rear half of the cover 58 between the bow and the leading edge 28 to slacken so that as the bow moves beneath the leading edge the slackened rear portion of the cover is reversed and begins folding over the top of the front portion of the cover between the bow and the header. The bow 56 is located on the frame member 32 such that it is on opposite sides of but generally equidistant from the leading edge 28 in the extended and retracted positions of the frame member. Thus, when the frame member achieves the retracted position, the previously slackened rear portion of the cover is fully extended in the reverse direction above the front portion of the cover, the cover then being neatly folded generally in half. Of course, when the frame member is moved forward to the extended position the cover unfolds in a similar but reverse manner as the bow passes beneath the leading edge 28.

While the closure means according to this invention thus neatly folds and unfolds the cover, it is additionally desirable to reduce to an absolute minimum the space needed to stow the retracted cover 58 so as to maximize passenger head room. Such maximization is achieved through the use of cam means including a guide means 60 on the right sail panel structure and a follower means 63 on the radius arm 52. As seen best in FIGS. 4 and 5, the guide means includes a primary plate 61 having a ramp surface 62 thereon and a secondary plate 64 having a ramp surface 66 thereon, the secondary plate being pivotally attached to the primary plate at 68 and the latter being rigidly secured to a support 69 on the inner panel portion 46 by a fastener 70. As seen best in FIGS. 4 and 6, the follower means 63 includes a roller 72 rotatably supported on a bolt 74 fastened to the end of the radius arm 52, the roller 72 normally resting in a small groove 76, FIG. 2, in the top of right side rail 34 when the frame member is in the extended position.

In operation, as the frame member 32 moves rearwardly from the extended position as described hereinbefore, the upper edge 41 of the support plate 40 on the right side rail 34 passes beneath and then engages the underside of secondary plate 64. Referring to FIG. 6, as rearward movement of the frame member continues, the forward edge of the secondary plate is cammed onto the top of the right side rail, the latter sliding beneath the secondary member. As the frame member approaches the retracted position, the roller 72 on the radius arm engages the secondary plate 64, FIG. 6, and is caused to roll up ramp surface 66 and onto ramp surface 62 of the primary plate, the ramp surface thus lifting the bow 56 and folded cover 58 relative to the frame member. The orientation of the primary and secondary plates 61 and 64 is predetermined to position the bow 56 in very close proximity or juxtaposition to the underside of the roof structure when the retracted position of the frame member is achieved. Of course, by so lifting the bow the headroom available below the neatly folded cover 58 is maximized. Conversely, when the frame member is returned to the extended position, the roller 72 rolls back down the ramp surfaces and onto the right side rail to reposition the bow for normal cover support.

Having thus described the invention, what is claimed is:

1. In a vehicle body having a passenger compartment, a windshield structure situated forward of said passenger compartment, and a rigid roof structure over a portion of said passenger compartment including a leading edge spaced from said windshield support, retractable closure means for the space between said windshield support and said roof structure comprising, a frame member including a header and a transverse support bow, means supporting said frame member on said vehicle body for fore and aft bodily movement between an extended position spanning the distance between said leading edge and said windshield support and a retracted position beneath said roof structure, said transverse bow being situated substantially equal distances on opposite sides of said leading edge in the extended and the retracted positions of said frame member, a flexible cover, and means attaching said cover at a first edge thereof to said leading edge of said roof structure and at a second edge thereof to said header and at a location intermediate said edges to said transverse bow so that said cover is folded generally in half under said roof structure in response to bodily movement of said frame member from the extended to the retracted position thereof.

2. In a vehicle body having a passenger compartment, a windshield structure situated forward of said passenger compartment, and a rigid roof structure over a portion of said passenger compartment including a leading edge spaced from said windshield support, retractable closure means for the space between said windshield support and said roof structure comprising, a frame member including a header, means supporting said frame member on said vehicle body for fore and aft bodily movement between an extended position spanning the distance between said leading edge and said windshield support and a retracted position beneath said roof structure, a bow, means supporting said bow on said frame member in transverse orientation for bodily movement as a unit therewith and for generally vertical movement relative thereto, said bow being situated substantially equal distances on opposite sides of said leading edge in the extended and the retracted positions of said frame member, a flexible cover, means attaching said cover at a first edge thereof to said leading edge of said roof structure and at a second edge thereof to said header and at a location intermediate said edges to said transverse bow so that said cover is folded generally in half under said roof structure in response to bodily movement of said frame member from the extended to the retracted position thereof, and cam means on said frame member and on said vehicle body operative in response to movement of said frame member to the retracted position thereof to lift said bow relative to said frame member and thereby lift said folded cover into juxtaposition with said roof structure for maximization of passenger head room under said folded cover.

3. In a vehicle body having a passenger compartment, a windshield structure situated forward of said passenger compartment, and a rigid roof structure over a portion of said passenger compartment including a leading edge spaced from said windshield support, retractable closure means for the space between said windshield support and said roof structure comprising, a frame member including a transverse header and a pair of longitudinal side rails, means supporting said frame member on said vehicle body for fore and aft bodily movement between an extended position wherein said header is supportingly engaged on said windshield support with said side rails spanning the distance between the latter and said leading edge and a retracted position wherein said frame member is situated beneath said roof structure, a pair of radius arms, means supporting each of said radius arms on a respective one of said side rails for pivotal movement about a fixed transverse axis of said frame member, a bow, means rigidly connecting each end of said bow to a corresponding one of said radius arms thereby to support said bow on said frame member in transverse orientation for bodily movement as a unit therewith and for generally vertical movement relative thereto, said bow being situated substantially equal distances on opposite sides of said leading edge in the extended and the retracted positions of said frame member, a flexible cover, means attaching said cover at a first edge thereof to said leading edge of said roof structure and at a second edge thereof to said header and at a location intermediate said edges to said transverse bow so that said cover is folded generally in half under said roof structure in response to bodily movement of said frame member from the extended to the retracted position thereof, a pair of cam guides, means mounting respective ones of said cam guides on said vehicle body on opposite sides of said roof structure, a pair of cam followers, and means mounting said cam followers on respective ones of said radius arms, said cam followers being engageable on said cam guides during bodily movement of said frame member from the extended to the retracted position thereof and said cam guides thereafter being operative through said cam followers to pivot said radius arms relative to said frame member and thereby lift said bow to bring said folded cover into juxtaposition with said roof structure and maximize passenger head room.

* * * * *

PO-1050
(5/69)

UNITED STATES PATENT OFFICE
CERTIFICATE OF CORRECTION

Patent No. 3,655,238          Dated April 11, 1972

Inventor(s) Ted Stewart

It is certified that error appears in the above-identified patent and that said Letters Patent are hereby corrected as shown below:

On the title page, "Assignee: General Electric Corporation, Detroit, Mich." should read -- Assignee: General Motors Corporation, Detroit, Mich. --

Signed and sealed this 1st day of August 1972.

(SEAL)
Attest:

EDWARD M. FLETCHER, JR.      ROBERT GOTTSCHALK
Attesting Officer             Commissioner of Patents